US008023936B2

(12) United States Patent
Hudson et al.

(10) Patent No.: US 8,023,936 B2
(45) Date of Patent: Sep. 20, 2011

(54) METHOD AND SYSTEM FOR MONITORING AD-HOC NETWORK NODES

(75) Inventors: John G. Hudson, Laguna Niguel, CA (US); Rolf P. Dietiker, Laguna Niguel, CA (US); Michelle P. Bui, Irvine, CA (US)

(73) Assignee: The Boeing Company, Chicago, IL (US)

( * ) Notice: Subject to any disclaimer, the term of this patent is extended or adjusted under 35 U.S.C. 154(b) by 1206 days.

(21) Appl. No.: 10/969,087

(22) Filed: Oct. 20, 2004

(65) Prior Publication Data
US 2005/0232185 A1    Oct. 20, 2005

Related U.S. Application Data

(60) Provisional application No. 60/563,358, filed on Apr. 19, 2004.

(51) Int. Cl.
*H04B 7/19* (2006.01)
(52) U.S. Cl. ............ 455/421; 342/357.07; 342/454; 342/455
(58) Field of Classification Search .......... 370/338, 370/390, 254, 400; 342/357.07, 454, 455; 701/1, 36; 455/421
See application file for complete search history.

(56) References Cited

U.S. PATENT DOCUMENTS

| 5,570,095 | A  | * | 10/1996 | Drouilhet et al. ....... 342/357.07 |
| 6,044,323 | A  | * | 3/2000  | Yee et al. ................ 701/120 |
| 6,052,779 | A  | * | 4/2000  | Jackson et al. ............. 713/2 |
| 6,414,955 | B1 | * | 7/2002  | Clare et al. ............. 370/390 |
| 6,650,902 | B1 | * | 11/2003 | Richton ............... 455/456.3 |
| 6,760,584 | B2 | * | 7/2004  | Jou .................... 455/434 |
| 7,020,501 | B1 | * | 3/2006  | Elliott et al. ........... 455/574 |
| 7,072,977 | B1 |   | 7/2006  | Bernard et al. |
| 7,283,810 | B1 | * | 10/2007 | Arakawa et al. ....... 455/414.1 |
| 7,610,396 | B2 |   | 10/2009 | Taglienti et al. |
| 2003/0026268 | A1 | * | 2/2003 | Navas ................. 370/400 |
| 2003/0030581 | A1 | * | 2/2003 | Roy .................... 342/36 |
| 2003/0093203 | A1 | * | 5/2003 | Adachi et al. .......... 701/50 |
| 2003/0120502 | A1 |   | 6/2003 | Robb et al. |
| 2003/0130769 | A1 |   | 7/2003 | Farley et al. |
| 2003/0179742 | A1 | * | 9/2003 | Ogier et al. ........... 370/351 |

(Continued)

OTHER PUBLICATIONS

Non-Final Office Action on co-pending U.S. Appl. No. 10/969,563 mailed Sep. 22, 2008.

(Continued)

*Primary Examiner* — Patrick N Edouard
*Assistant Examiner* — Julio Perez
(74) *Attorney, Agent, or Firm* — Yee & Associates, P.C.

(57) ABSTRACT

A method and system for monitoring a mobile ad-hoc network node (e.g. a network enabled aircraft) is provided. The method includes, receiving a message notifying when the ad-hoc node is preparing to join the ad-hoc network; and determining based on a threshold value, when the ad-hoc node should be joining a monitoring system that tracks the status and availability of ad-hoc nodes. The method generates a status message if the ad-hoc node fails to join the monitoring system. The message is received by the monitoring system via and external source to the ad-hoc network. The system includes a data center that receives the message notifying when the node is preparing to join the ad-hoc network; and determines based on a threshold value, when the ad-hoc node should be joining the ad-hoc network and monitoring system.

12 Claims, 13 Drawing Sheets

U.S. PATENT DOCUMENTS

| | | | | |
|---|---|---|---|---|
| 2003/0236894 | A1* | 12/2003 | Herley | 709/229 |
| 2004/0157611 | A1* | 8/2004 | Smith et al. | 455/445 |
| 2004/0167685 | A1* | 8/2004 | Ryan et al. | 701/16 |
| 2004/0193362 | A1* | 9/2004 | Baiada et al. | 701/120 |
| 2004/0203435 | A1* | 10/2004 | Karlquist et al. | 455/67.11 |
| 2005/0063382 | A1* | 3/2005 | Fenner | 370/389 |
| 2006/0159051 | A1* | 7/2006 | English | 370/332 |

OTHER PUBLICATIONS

Final Office Action on co-pending U.S. Appl. No. 10/969,563 mailed Apr. 2, 2009.

USPTO office action for U.S. Appl. No. 10/969,563 dated Nov. 16, 2009.

* cited by examiner

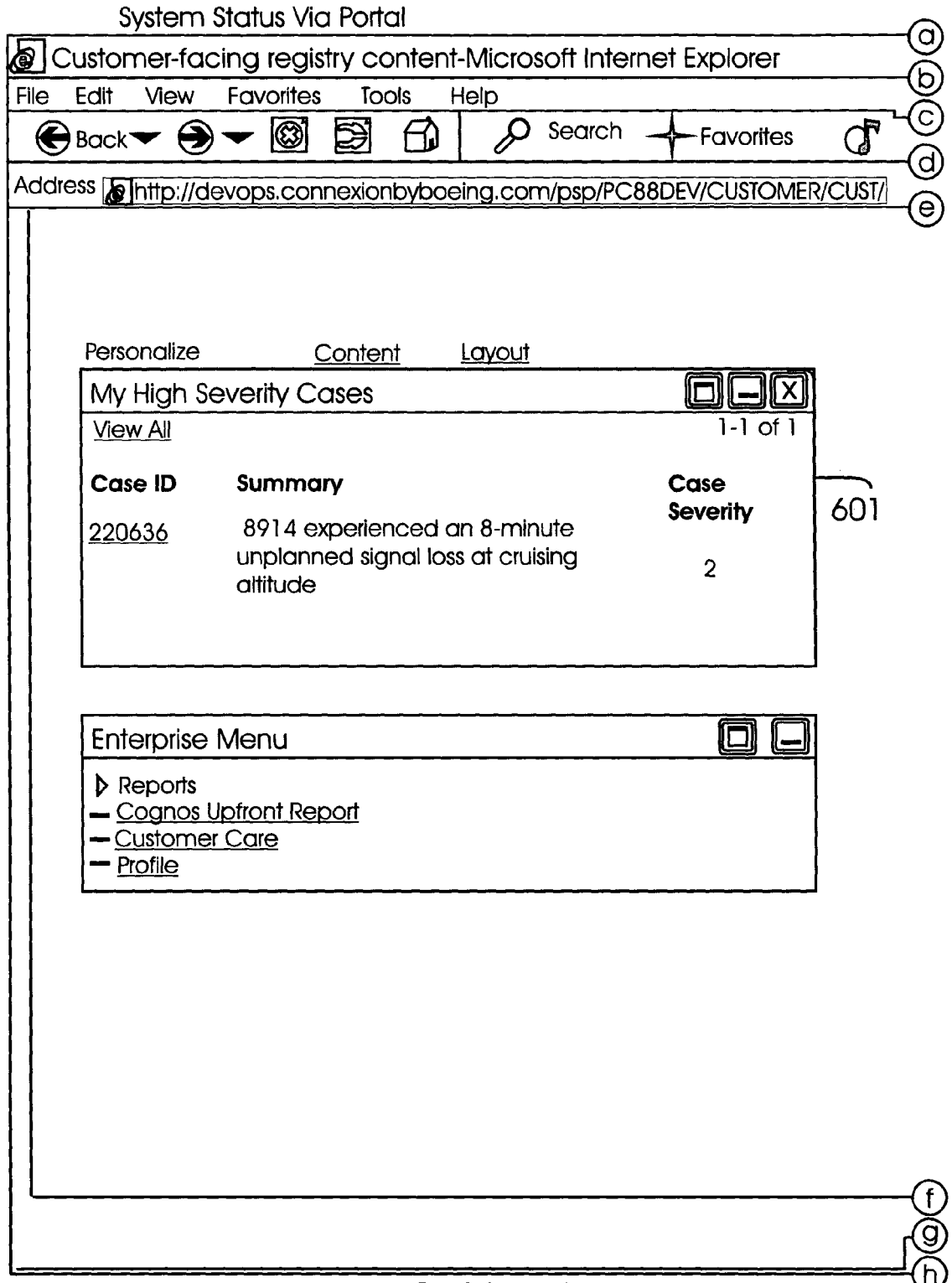
FIGURE 6-(i)

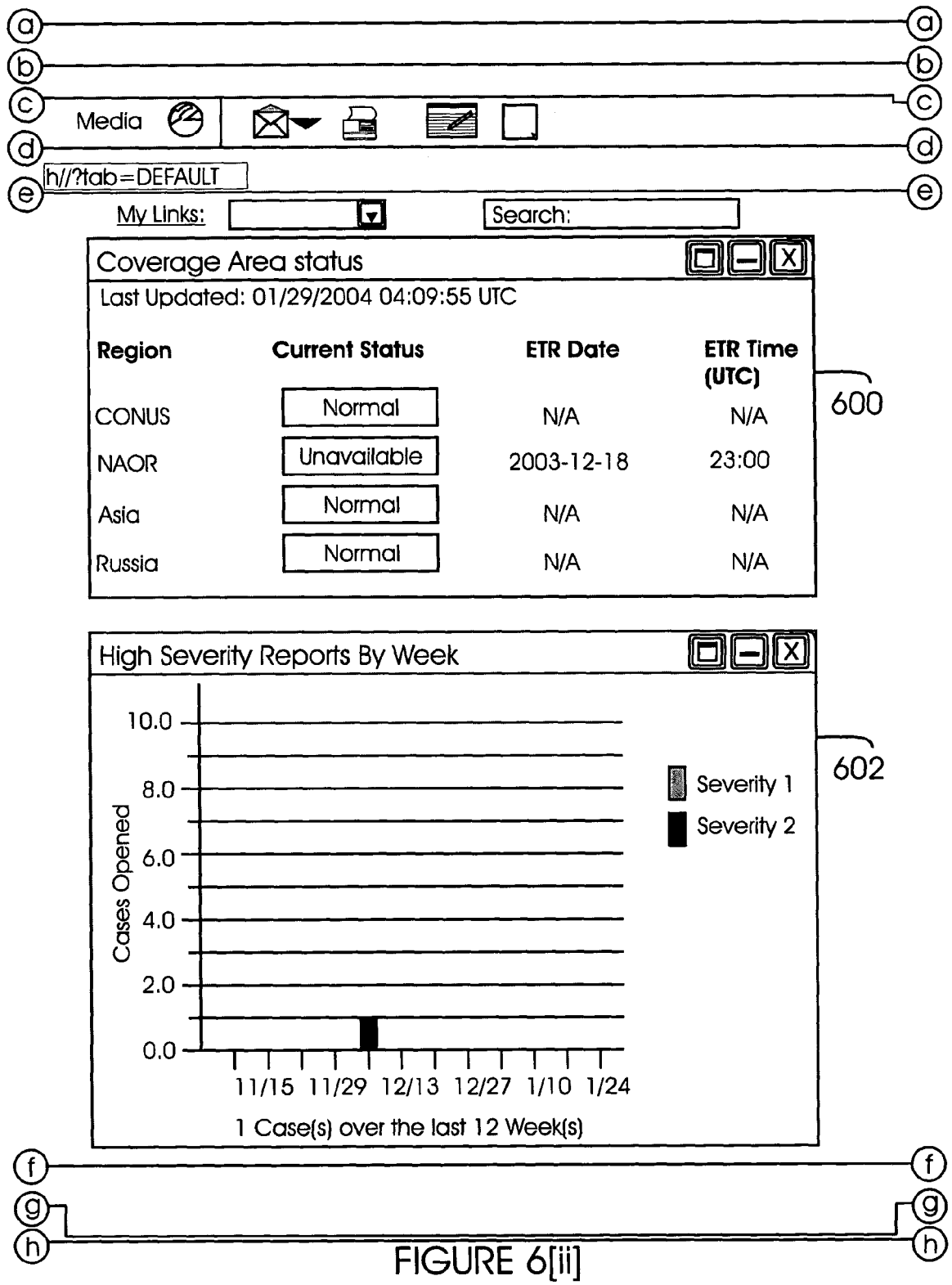
FIGURE 6[ii]

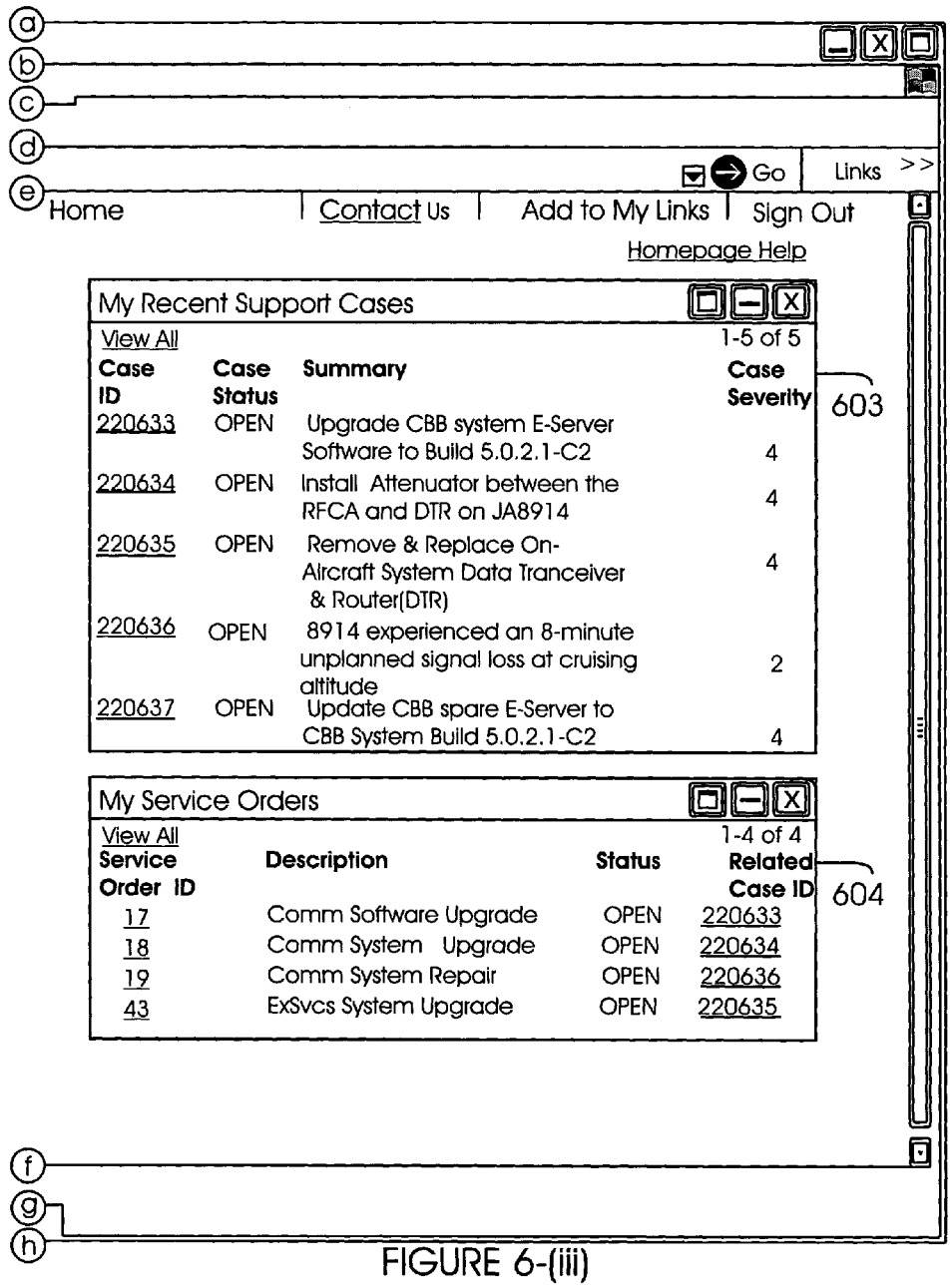
FIGURE 6-(iii)

METHOD AND SYSTEM FOR MONITORING AD-HOC NETWORK NODES

CROSS REFERENCE TO RELATED APPLICATION

This application claims priority under 35 U.S.C. §119(e)(1) to the following provisional patent application, the disclosure of which is incorporated herein by reference in its entirety Ser. No. 60/563,358, filing date Apr. 19, 2004.

BACKGROUND OF THE INVENTION

1. Field of the Invention

This invention relates generally to network monitoring, and more particularly, to a method and system to manage ad-hoc network nodes.

2. Description of Related Art

Computer networks exist and operate in various forms. Networks include local area networks, wide area networks, wireless networks, the Internet and others. An ad-hoc network, as used herein throughout the specification is a network that is constantly changing. An ad-hoc network node is an entity that is capable of joining or leaving the ad-hoc network at any given time.

Various entities exist that may fall within the ad-hoc network node concept described above. For example, aircrafts, ships, boats, trains, buses and even automobiles can be classified as ad-hoc network nodes if they are monitored using a network. With today's changing global society it is important to efficiently and reliably monitor these ad-hoc network nodes. The term node and ad-hoc network node; and network and ad-hoc network are used interchangeably throughout this specification.

Conventional monitoring systems fail to effectively monitor ad-hoc network nodes. For example, in the case of aircrafts, currently, ACARS (Aircraft Communications Addressing and Reporting System) a standard message format incorporated herein by reference in its entirety, SITA Flight Briefing Service and other similar systems report data on aircraft flight operations by sending and receiving radio frequency or facsimile messages from a ground station. ACARS and SITA collect information on an aircraft and send messages from the aircraft to a ground station where the messages are sent to a computer.

Although useful, the data reported by ACARS and the other available systems is delayed and sometimes interrupted or not available for a number of reasons, such as the aircraft being out of range, or weather conditions, etc.

Real-time aircraft location/position data (may also be referred to as navigation data), for example, longitude and latitude of an airborne aircraft may be collected via satellites. An airplane communicates with one or more satellite and data is sent to a satellite gateway. The gateway in turn provides navigation data to one or more ground stations. Real-time information and ACARS messages are often un-correlated and hence under utilized.

Therefore, there is a need for a method and system that can receive plural data inputs and efficiently monitor ad-hoc network node (for example, aircraft) status.

SUMMARY OF THE INVENTION

In one aspect of the present invention, a method for monitoring a mobile ad-hoc network node using an ad-hoc network is provided. The method includes, receiving a message notifying when a network node is preparing to join the ad-hoc network; determining based on a threshold value, when the ad-hoc network node should be active; and receiving a message notifying when the ad-hoc network node will no longer be part of the ad-hoc network. The message is received by a monitoring system via a source external to the ad-hoc network. The method also includes, generating a status message if the ad-hoc network node fails to join the monitoring system.

In yet another aspect, a computer-readable medium storing computer-executable process steps of a process for use in a computer system for monitoring a mobile ad-hoc network node using an ad-hoc network. The medium includes, code for receiving a message notifying when a mobile ad-hoc node is preparing to join the ad-hoc network; and code for determining based on a threshold value, when the mobile ad-hoc node should be joining the ad-hoc network. The computer readable medium also includes code for generating a status message if the mobile ad-hoc node fails to join the ad-hoc network.

In yet another aspect of the present invention, an apparatus for monitoring a mobile ad-hoc network node is provided. The apparatus includes, a storage device for storing computer executable process steps; and a processor for executing computer executable process steps for receiving a message notifying when a mobile ad-hoc node is preparing to join the ad-hoc network; and determining based on a threshold value, when the mobile ad-hoc node should be joining the ad-hoc network.

In yet another aspect, the present invention includes, a system for monitoring a mobile ad-hoc node using an ad-hoc network is provided. The system includes, a data center that receives a message notifying when the mobile ad-hoc node is preparing to join the ad-hoc network; and determines based on a threshold value, when the mobile ad-hoc node should be joining the data center. The message is received via a source external to the ad-hoc network.

In one aspect, the present invention provides a monitoring system that utilizes automated data external to an ad-hoc network (e.g. the Internet or any other network) to receive data from and send messages to an ad-hoc network node (e.g. an aircraft).

In yet another aspect, an operations data system is connected to a data-center that continuously monitors the status of an ad-hoc network node (e.g. an aircraft) aircraft in real-time, either directly or in conjunction with any existing reporting system. The present invention allows a control center, or any other entity to efficiently monitor ad-hoc nodes.

In one aspect, the present invention provides flight operations data system that receives information from existing aircraft reporting systems, and may utilize this information to predict the status of an aircraft.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 1A-1 shows a block diagram of a monitoring system for monitoring ad-hoc network nodes, according to one aspect of the present invention;

FIG. 6 shows an example of a screen with a status message, according to one aspect of the present invention.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein, specifically to provide for a method and system for monitoring the status of ad-hoc nodes in real-time and sending messages to the ad-hoc node and/or an operations center using the ad-hoc network (for example, the Internet).

In one aspect of the present invention, a method and system is provided whereby an aircraft having an on-board installation for high-speed Internet access may be continuously monitored from a ground station and receive messages via the Internet from the ground station. The system may work alone or in conjunction with other aircraft reporting systems fed from airline control centers to monitor the status of aircraft from loading to unloading and to send messages via the Internet to the aircraft and or airline control centers via email or other systems.

It is noteworthy that although the examples provided below to illustrate the adaptive aspects of the present invention are based on monitoring aircraft flight status, the same method and system can be used to monitor other ad-hoc nodes, for example, ships, trains, buses and/or automobiles.

To facilitate an understanding of the preferred embodiments of the invention, the general architecture and operation of a system for collecting an aircraft's flight operations data will be described. The specific architecture and operation of the preferred embodiments will then be described with reference to the general architecture.

Figure 1A:
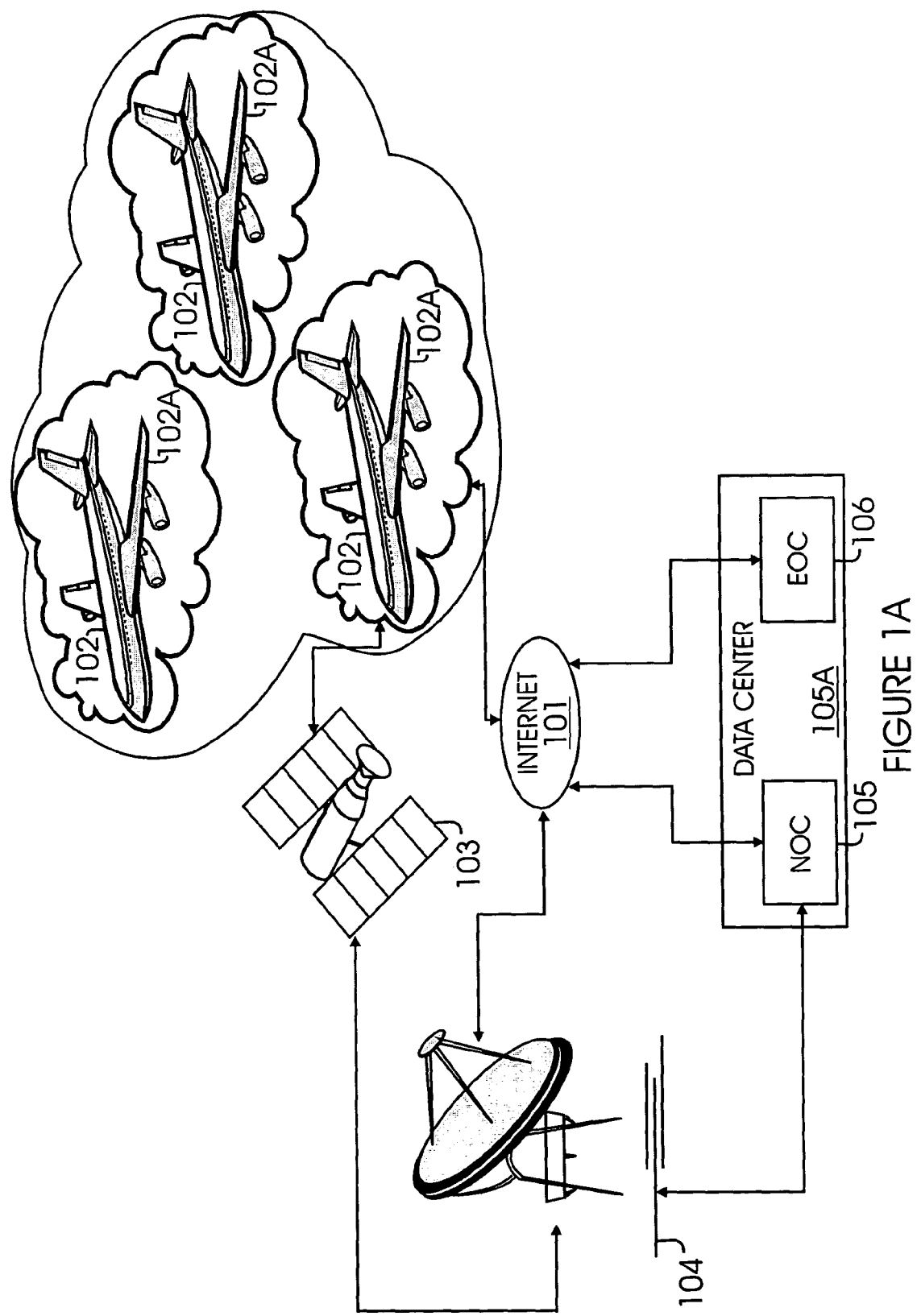
FIGS. 1A-1C show block diagrams of flight monitoring systems, used according to one aspect of the present invention.
Figures 1, 1A:
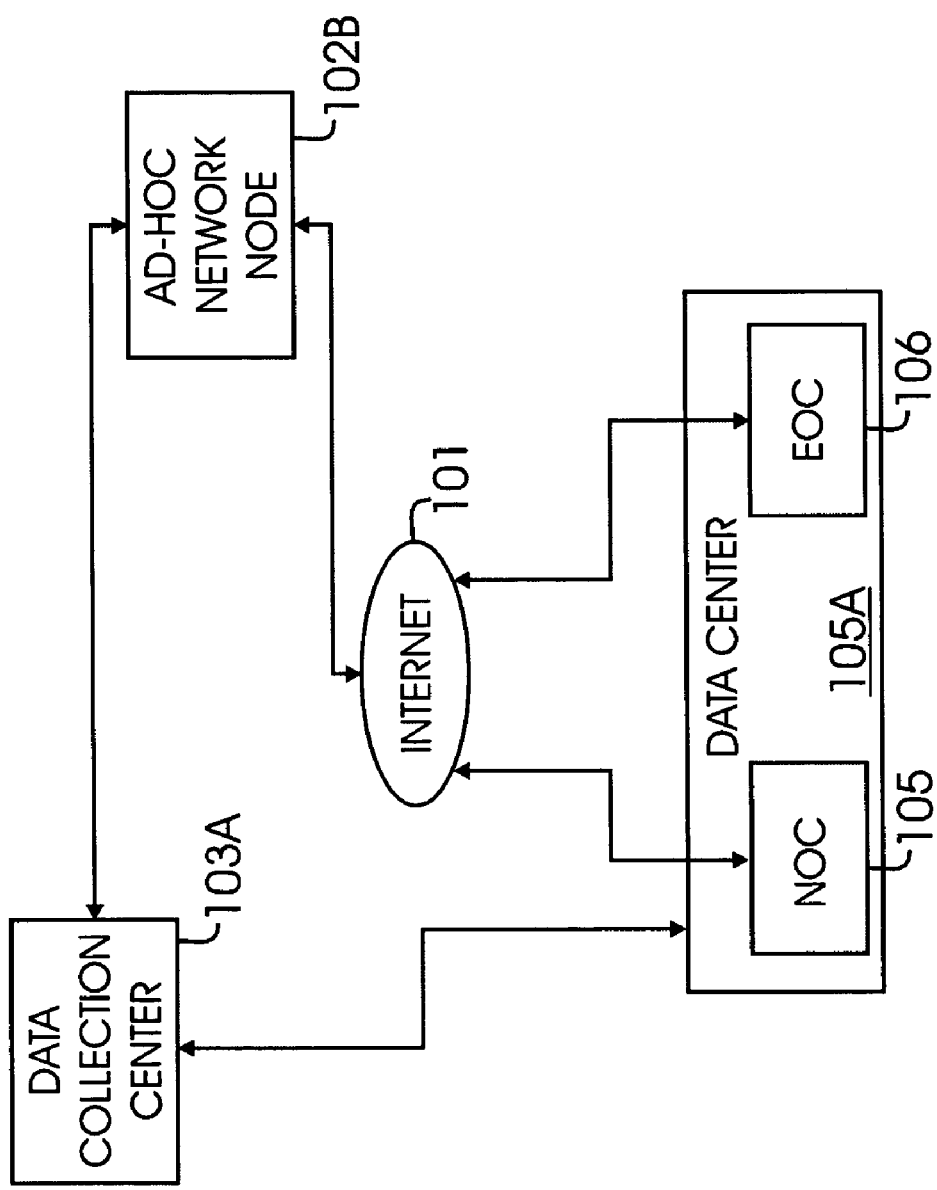

Data Collection System:

FIG. 1A-1 shows a top-level block diagram for monitoring the status of an ad-hoc network node 102B. Ad-hoc network node 102B can leave or join the network (e.g. the Internet) at any time. Node 102B is operationally coupled to a data collection center 103A that transmits node 102B data to a data center 105A. As discussed above, node 102B may be an aircraft, boat, train and/or automobile. Data center 105A includes an enterprise class operation center ("EOC") 106 and network operation center ("NOC") 105 that receive node 102B data via Internet 101 and/or data collection center 103A. A block diagram for monitoring an aircraft (i.e. node 102B) will now be described with respect to FIGS. 1A-1E.

FIG. 1A shows a top-level block diagram for collecting real-time navigation data from an aircraft that functions as ad-hoc network node. An aircraft data center 102 located on aircraft 102A communicates with a satellite 103 and with the Internet 101 (the ad-hoc network). As shown in FIG. 1A, plural aircrafts operate as ad-hoc network nodes. Data center 102 has the capability to connect to the Internet 101 via an Internet provider.

It is noteworthy that the ad-hoc network in this example is Internet 101, however, the adaptive aspects of the present invention may be implemented using any type of network, for example, SITA or ARINC, a private network or any other automated system that can send and receive messages from an ad-hoc node. Also since data center 105A is operationally coupled to the Internet 101, it can also be classified as an ad-hoc network.

Satellite 103 collects aircraft 102A flight data and navigation data, which is then passed to satellite gateway 104, that is functionally, coupled to Internet 101 (described below) and/ or a data center 105A.

As discussed above, data center 105A includes a network operation center ("NOC") 105 and an enterprise operation center ("EOC") 106. Both NOC 105 and EOC 106 include at least a computing system for executing the computer-executable code, according to one aspect of the present invention. A description of a computing system used by NOC 105 and/or EOC 106 is provided below.

NOC 105 monitors a computing network by receiving input from plural sources, for example, ACARS messages, and real-time aircraft status information. NOC 105 processes the various inputs, according to the adaptive aspects of the present invention.

It is noteworthy that the invention is not limited to data center 105A architecture. NOC 105 and EOC 106 may be an integral part of data center 105A to execute the process steps of the present invention. The modular components shown in various figures and described herein are intended to illustrate the adaptive aspects of the present invention and not to limit the present invention to any particular configuration.

Figure 1B:
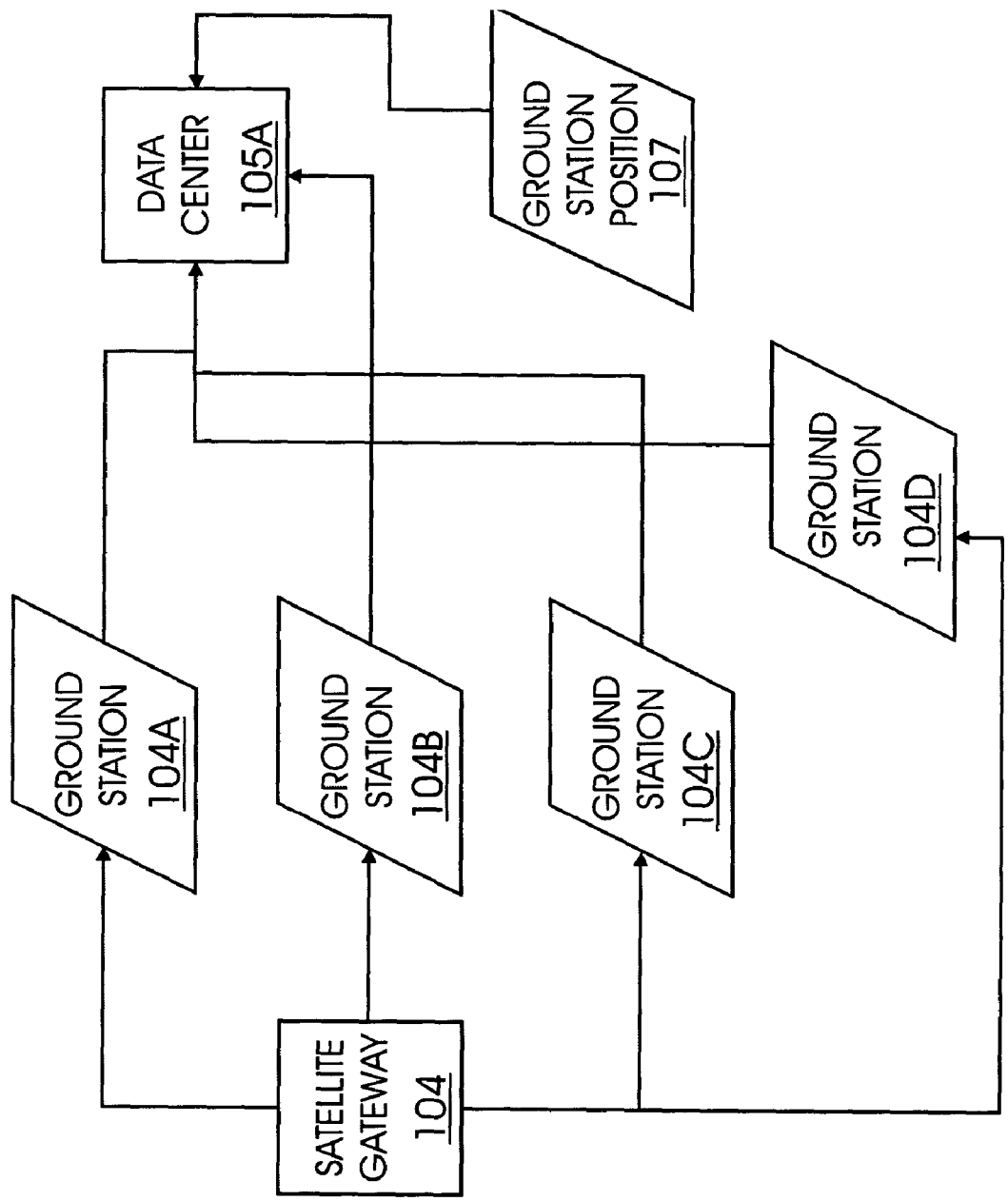

FIG. 1B shows another block diagram of the data collection system described above with respect to FIG. 1A. FIG. 1B shows plural ground stations 104A-104D that collect data from an aircraft while it is in transit. Ground stations 104A-104D are similar to satellite gateway 104. Ground station position data 107 includes the locations of plural ground stations 104A-104D and sent to data center 105A. Data collected from the ground stations is processed by data center 105A, according to the adaptive aspects of the present invention.

Figure 1C:
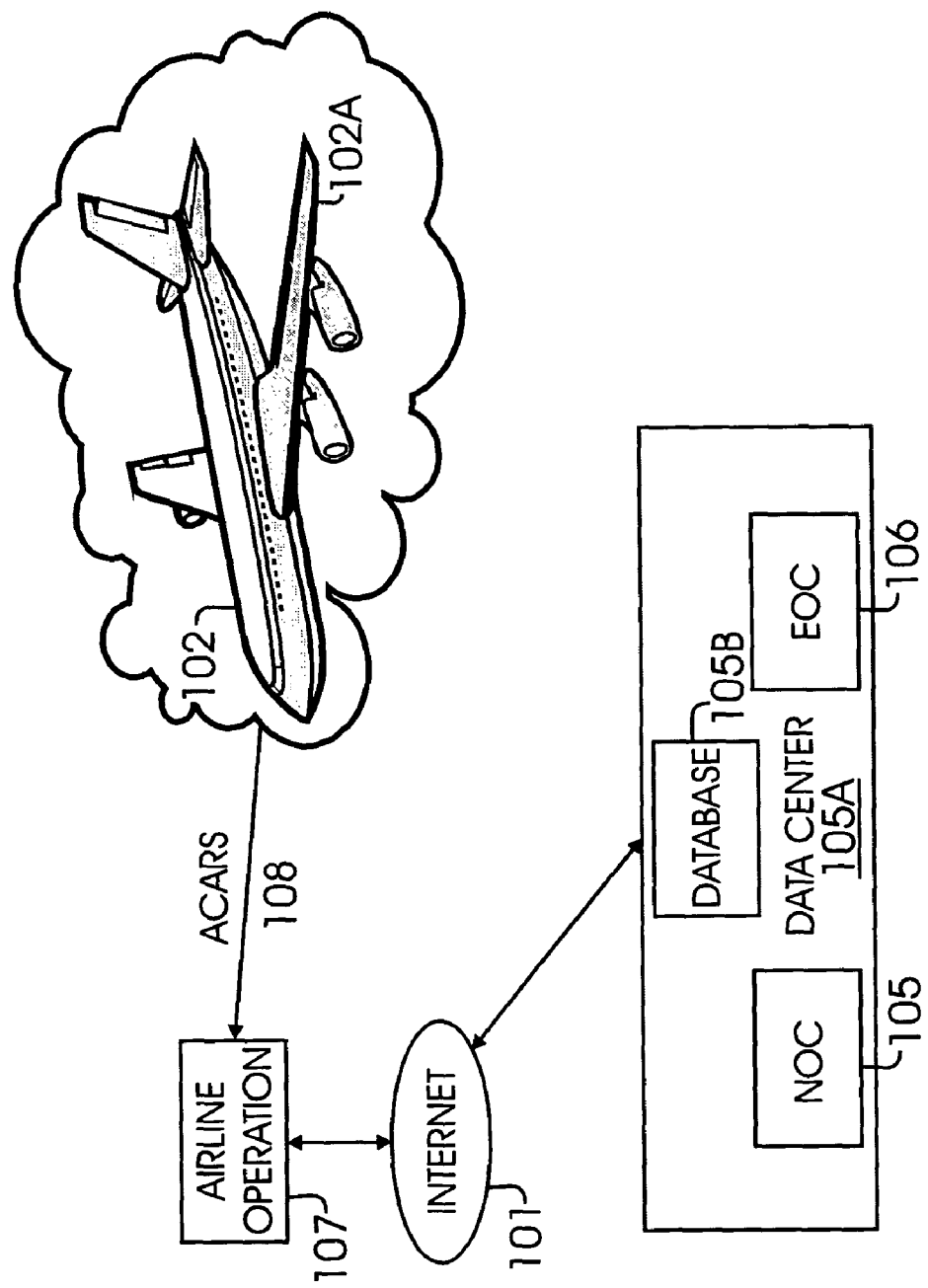

FIG. 1C shows a block diagram for collecting ACARS messages that are used by data center 105A. Aircraft 102A via data center 102 provides status information to an airline operations center 107. ACARS message 108 is then sent to data center 105A via Internet 101.

In one aspect, ACARS message 108 may be sent using electronic mail or file transfer protocol ("FTP"). It is noteworthy that the adaptive aspects of the present invention are not limited to any particular protocol or system for transferring ACARS messages. ACARS messages 108 may be stored in database 105B and is accessible to both NOC 105 and EOC 106 for processing, as described below.

Figure 1D:
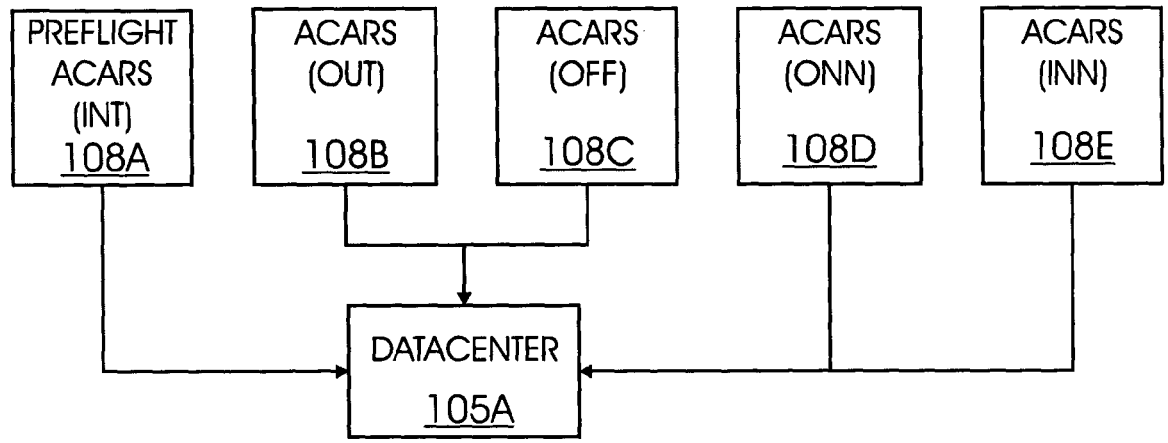
FIG. 1D shows examples of ACARS messages.

FIG. 1D shows a block diagram with various stages for ACARS messages 108. In general, an ACARS message may include, the flight status (i.e., Pre-flight, Flight Out, Flight Off, Flight On and Flight In), pre-flight time, an Airline unique identifier, flight number, aircraft registration number, scheduled departure airport, scheduled time of departure, actual departure time from the gate, time the aircraft takes off, scheduled arrival airport, passenger count, actual arrival airport, actual landing time and arrival time at the gate.

ACARS pre-flight message (INT) 108A includes basic flight information, for example, departure city, schedules departure time, scheduled arrival time, and scheduled arrival city.

Message (ACARS (OUT) 108B includes, actual departure time and passenger loading. Message 108C (ACARS(OFF) provides the time when the aircraft takes off and the time it is in the air.

Message 108D (ACARS (ONN) provides the time when the aircraft lands and message 108E (ACARS (INN) provides the actual arrival time at the gate, actual arrival airport and arrival city.

Figure 1E:
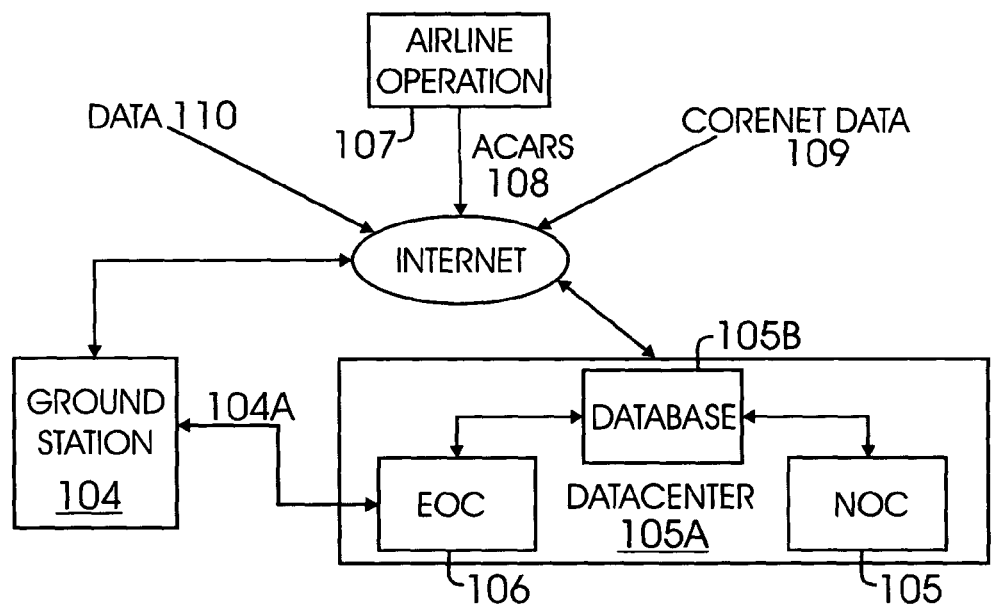
FIGS. 1E-1F show block diagrams of system components, used according to one aspect of the present invention.

FIG. 1E shows yet another block diagram of a data collection system that receives data 108, 109 and 110 from plural sources and is processed according to one aspect of the present invention, as described below. As discussed above with respect to FIG. 1C, ACARS messages 108 are received by data center 105A via Internet 101.

Ground station 104 provides real-time data, described above with respect to FIG. 1A. This data is collected by using Aircraft Inertial Reference Unit ('IRU") standard interface, incorporated herein by reference in its entirety. Data 104A may be received by EOC 106 and includes, real-time latitude and longitude positions of the aircraft, ground speed, tack angle, true heading, pitch angle, roll angle, body pitch angle, body role rate, body yaw rate, inertial altitude and inertial vertical speed.

Data 109 is received from aircraft data center 102 and includes an IATA airline identifier, flight number, aircraft's unique tail number, the actual departure airport, arrival airport, distance to destination, destination-estimated time of arrival and the time to destination.

Data 110 may be from any other source, for example, a government entity during an emergency and is received by data center 105A via the Internet 101. Data 110 may be delayed or real-time.

Figure 1F:
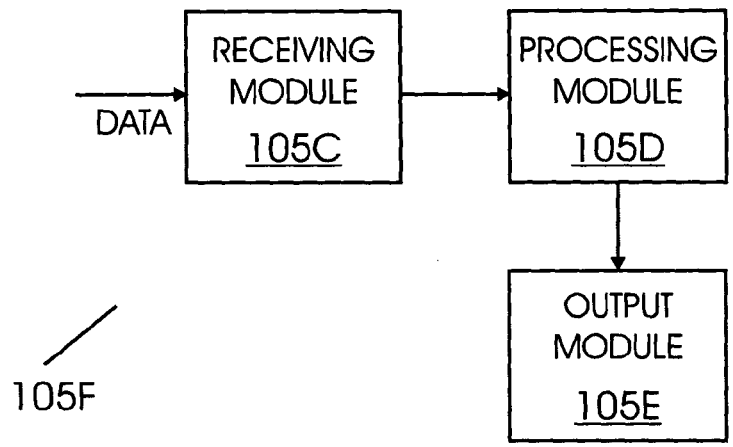

FIG. 1F shows a top-level block diagram of a system that executes the adaptive process steps, according to one aspect of the present invention. System 105F includes a receiving module 105C that receives data from an ad-hoc node 102B (for example, 104A, 108, 109, and/or 110) and forwards data to processing module 105D for processing the data, according to the various adaptive aspects of the present invention. Output module 105E outputs the processed information to a designated source in one or more formats. It is noteworthy that system 105F may be located in NOC 105 and/or EOC 106, or any other computing system that can be connected to the Internet 101.

Figure 1G:
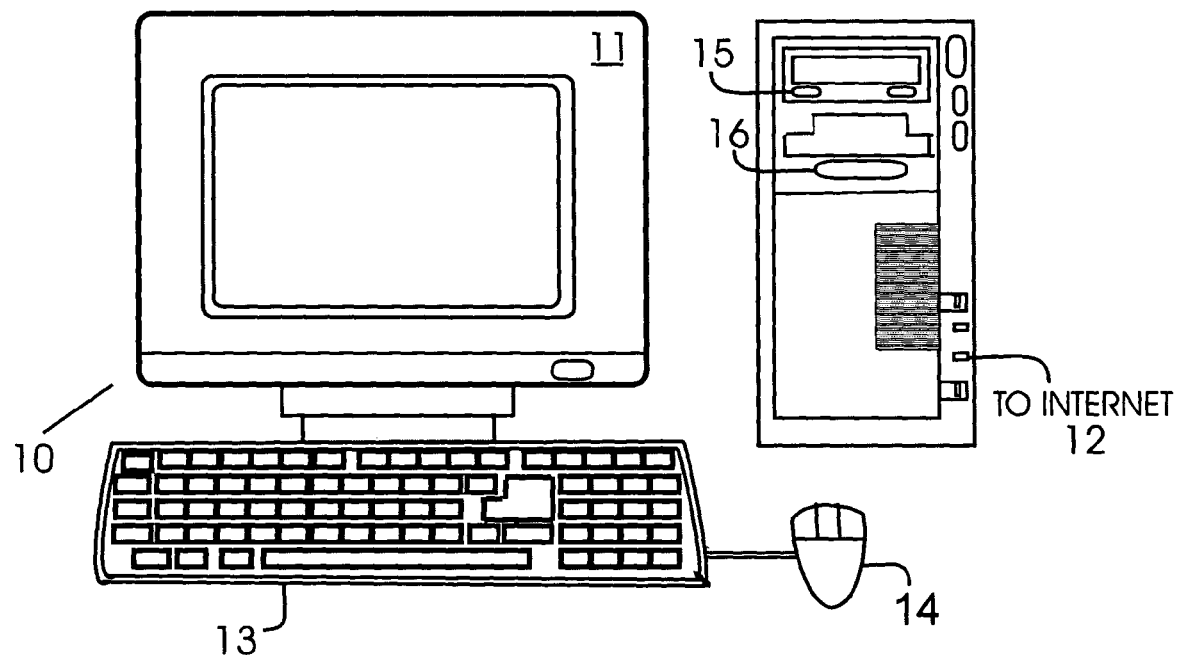
FIG. 1G shows a block diagram of a computing system for executing process steps, according to one aspect of the present invention.

Computing System:

FIG. 1G is a block diagram of a computing system for executing computer executable process steps according to one aspect of the present invention. FIG. 1G includes a host computer 10 and a monitor 11. Monitor 11 may be a CRT type, a LCD type, or any other type of color or monochrome display (or any other display device including a high definition television station).

Also provided with computer 10 are a keyboard 13 for entering data and user commands, and a pointing device 14 for processing objects displayed on monitor 11.

Computer 10 includes a computer-readable memory storage device 15 for storing readable data. Besides other programs, storage device 15 can store application programs including web browsers by which computer 10 connect to the Internet 101, and the computer-executable code according to the present invention.

According to one aspect of the present invention, computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, and data files stored on a CD-ROM.

A modem, an integrated services digital network (ISDN) connection, or the like also provide computer 10 with an Internet connection 12 to the World Wide Web (WWW). The Internet connection 12 allows computer 10 to download data files, application program files and computer-executable process steps embodying the present invention from Internet 101.

It is noteworthy that the present invention is not limited to the FIG. 1G architecture. For example, notebook or laptop computers, handheld devices, set-top boxes or any other system capable of running computer-executable process steps, as described below, may be used to implement the various aspects of the present invention.

Figure 1H:
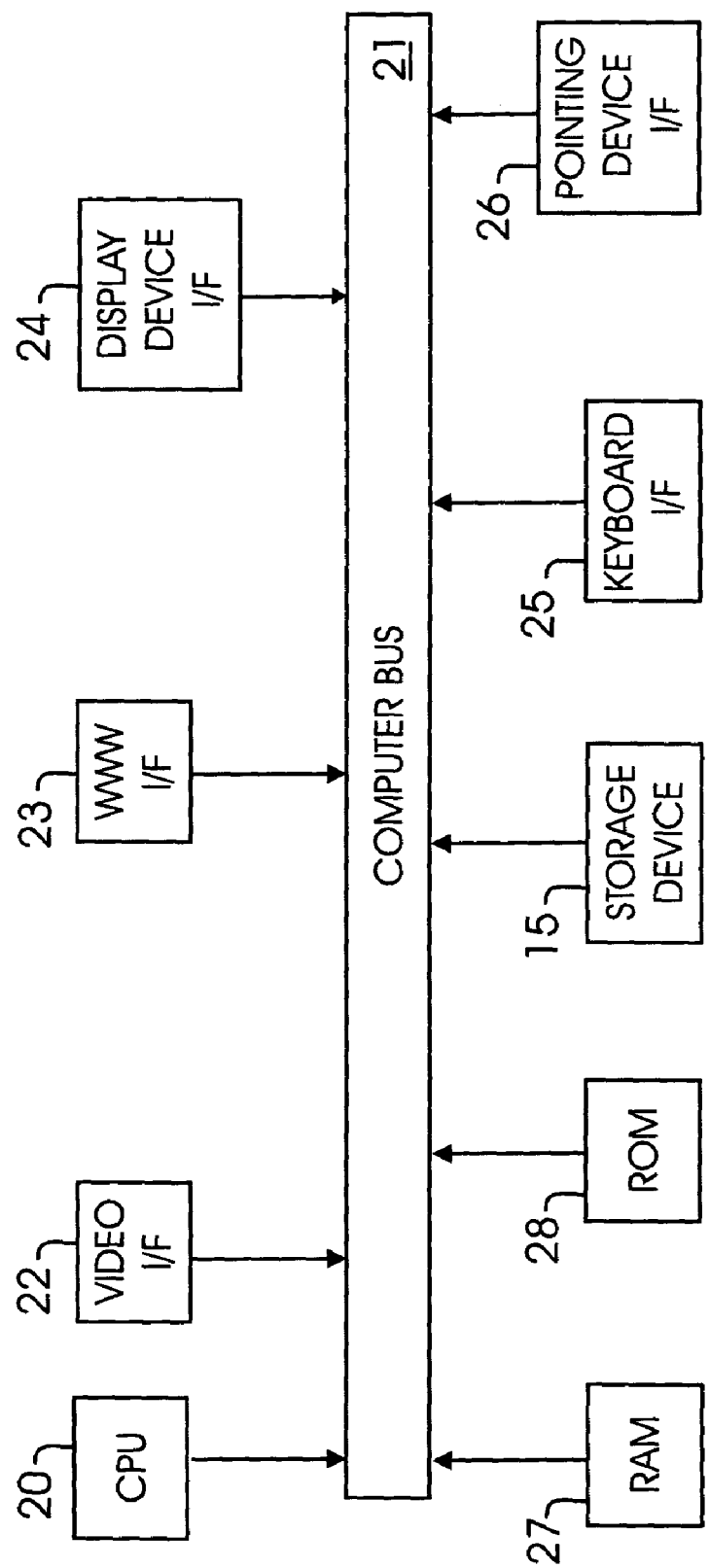
FIG. 1H shows the internal architecture of the computing system in FIG. 1G.

FIG. 1H is a block diagram showing the internal functional architecture of computer 10. As shown in FIG. 1H, computer 10 includes a central processing unit ("CPU") 20 for executing computer-executable process steps and interfaces with a computer bus 21. Also shown in FIG. 1H are a video interface 22, a WWW interface 23, a display device interface 24, a keyboard interface 25, a pointing device interface 26, and storage device 15.

As described above, storage device 15 stores operating system program files, application program files, web browsers, and other files. Some of these files are stored using an installation program. For example, CPU 20 executes computer-executable process steps of an installation program so that CPU 20 can properly execute the application program.

Random access memory ("RAM") 27 also interfaces to computer bus 21 to provide CPU 20 with access to memory storage. When executing stored computer-executable process steps from storage device 15 (or other storage media such as floppy disk 16 or WWW connection 12), CPU 20 stores and executes the process steps out of RAM 27.

Read only memory ("ROM") 28 is provided to store invariant instruction sequences such as start-up instruction sequences or basic input/output operating system (BIOS) sequences for operation of keyboard 13.

Computer-executable process steps, according to one aspect of the present invention may be performed using the Internet 101. The following provides a brief description of the Internet.

Internet 101:

The Internet connects plural computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language (XML) as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs also enable two programs on two separate computers to communicate with each other through simple object access protocol ("SOAP"), extensible markup language ("XML"), and other protocols published by the W3C consortium, incorporated herein by reference in its entirety.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP). It is noteworthy that the invention is not limited to standard WWW or W3C protocols for server access and information exchange.

Process Flow:

FIGS. 2-5 show flow diagrams of computer-executable process steps according to the present invention for monitoring aircraft status. The process steps may be executed using a computing system, for example, system 10. In one aspect, an independent data point (for example, ACARS message 108) is used by NOC 105 to determine when an aircraft should be joining a network monitoring system, for example, flight data center 105A. Retroactive action may be taken if the aircraft does not join data center 105A within a set threshold period. The threshold period may be programmed and can vary from one type of aircraft to another.

Figure 2:
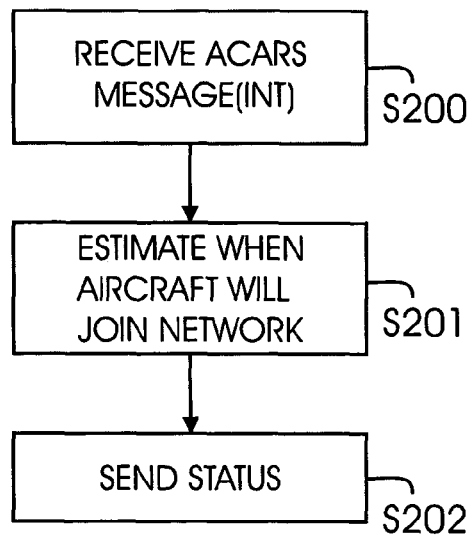
FIGS. 2-5 show process flow diagrams of computer-executables steps, according to one aspect of the present invention.

Turning in detail to FIG. 2, in step S200 message 108A (ACARS (INT)) (or 108B) is received by data center 105A. Message 108A (or 108B) is received by receiving module 105C in NOC 105. Based on message 108A, NOC 105 can estimate when aircraft 102A should be joining (i.e. communicating in-flight messages) data center 105A.

In step S202, NOC 105 sends a status message to the airline or any other entity that has interest in monitoring the flight status of aircraft 102A.

Figure 3:
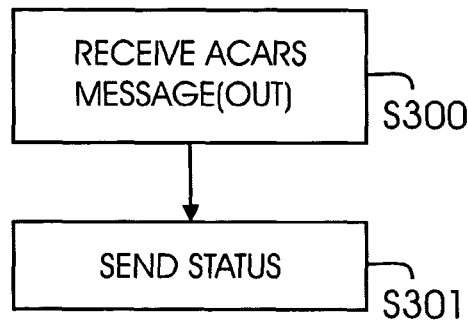

In FIG. 3, in step S300, data center 105A receives ACARS message 108B notifying data center 105A that the gate at the departure airport has been closed. In step S301, NOC 105 sends an updated status message (i.e., update from step S202, FIG. 2) via output module 105E.

Figure 4:
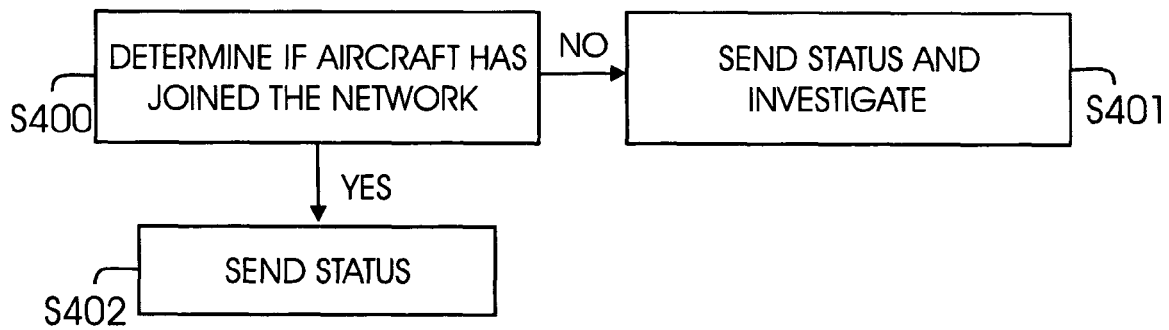

Based on FIG. 2 and 3 process steps, data center 105A is aware of when an aircraft should be joining NOC 105. As shown in FIG. 4, in step S400, NOC 105 determines if aircraft 102A has joined. This is based on the ACARS messages 108A and/or 108B, which are independent of data center 105A. NOC 105 searches for aircraft 102A based on the ACARS message 108A (or 108B).

If aircraft 102A does not join NOC 105 in step S400, then in step S401, the process sends a message to a competent entity to start investigating why aircraft 102A failed to join NOC 105. Various tools may be used to start the investigation, for example, an email or instant message may be sent to the airline, via Internet 101 to seek further clarification on the status. The airline can then send an electronic message to aircraft 102A. It is noteworthy that encrypted and secured messages may be used for electronic communication. Also, if authorized, data center 105A may directly send a message to aircraft 102A via Internet 101. ACARS 108A may also be correlated with real-time data 104A, to ascertain the potential failure in step S400.

If aircraft 102A joins in step S400 then in step S402, NOC 105 sends an updated message to the airline or any other entity.

Figure 5:
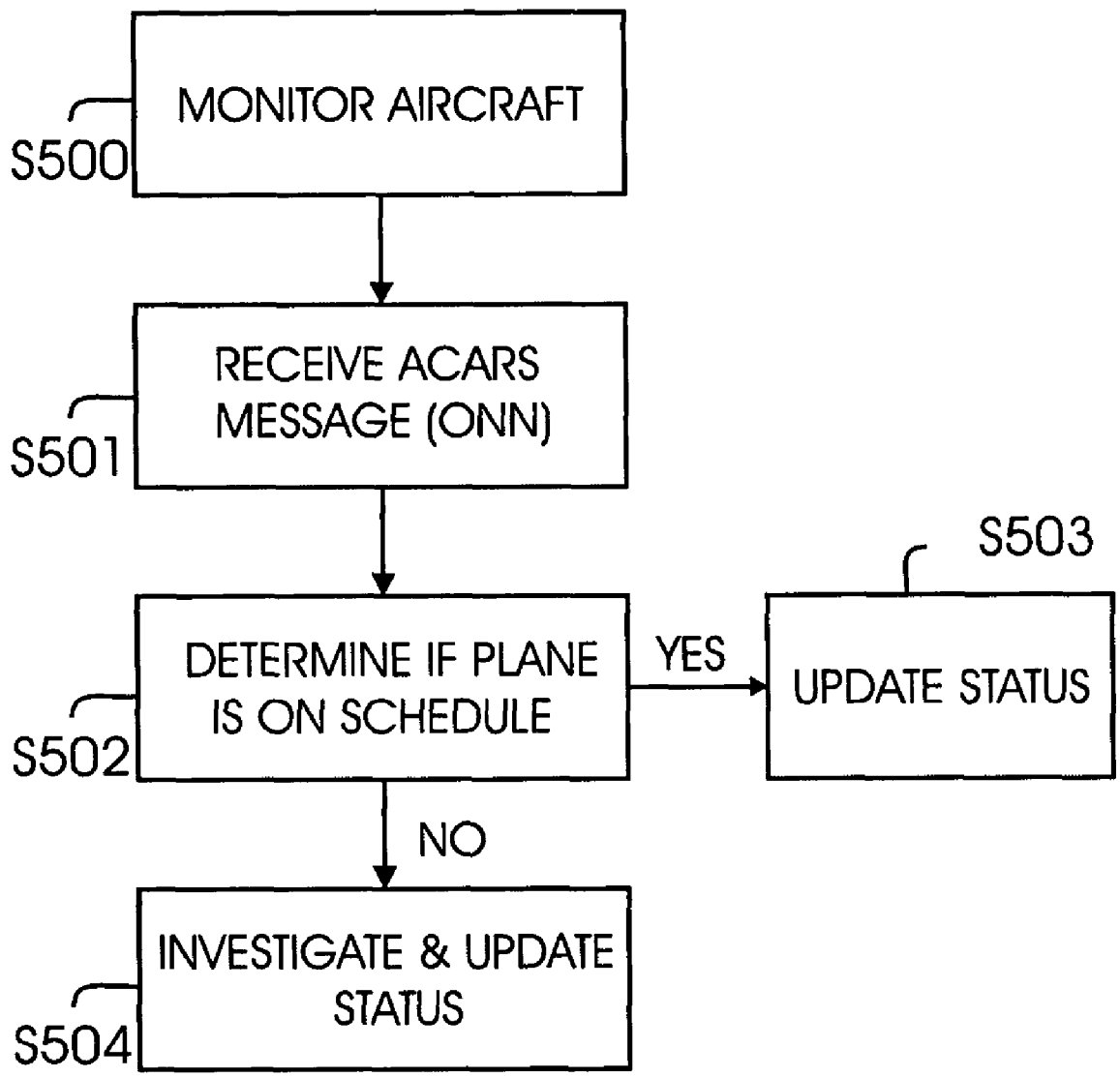

As shown in FIG. 5, in step S500, data center 105A continues to monitor flight data for aircraft 102A. This includes receiving various data points, as discussed above.

In step S501, data center 105A receives message 108D, when the plane lands. In step S502, NOC 105 determines (using processing module 105D) if aircraft 102A landed within a certain window of time to ascertain if aircraft 102A arrived on time. If aircraft 102A arrived on time (or time window) then in step S503 the status of aircraft 102A is updated.

If there is a deviation in aircraft 102A arrival time, i.e., if it arrived too soon or too late, then the process triggers an investigation in step S504. The investigation is conducted to determine the cause for early arrival or delay. Again data 104A, 109 and 110 may be used to determine the cause for such deviation. A message may be sent to the airline or aircraft 102A, or any other entity involved in the flight. The message may be sent using Internet 101.

FIG. 6 shows a screen shot of a status screen, as provided by NOC 105, in one aspect of the present invention. This report is accessible for an authorized entity, for example, an airline, a partner or customer.

Various report formats are made available, based on an end-user's needs. For example, window 600 shows the geographic region where Internet access was provided on aircraft 102A to passengers. Window 601 provides a listing of cases with abnormal flight patterns, based on the severity of the cases. Window 601 shows that flight 8914 experienced an 8-minute unplanned signal loss. Window 602 provides a graphical display of 'high severity" reports based on time.

Window 603 shows a listing of all support cases by a customer and window 604 shows a listing of all orders for a customer. The reports in FIG. 6 may be produced using output module 105E and can be used for various logistical and preventive maintenance purposes.

In one aspect, the present invention provides a flight operations data system that utilizes the Internet to receive data from and send messages to an aircraft. The present invention provides flight operations data system that receives information from existing aircraft reporting systems, and may utilize this information to predict the status of an aircraft. The present invention, in yet another aspect, provides an improved flight operations data system that utilizes the Internet to receive data from and send messages to an aircraft in conjunction with existing aircraft reporting systems to enhance the data available to an airline company or any other entity.

In yet another aspect, an improved flight operations data system is connected to a Network Operating Center that continuously monitors the status of the aircraft in real-time, either directly or in conjunction with any existing aircraft reporting system on the aircraft.

Figure 7:
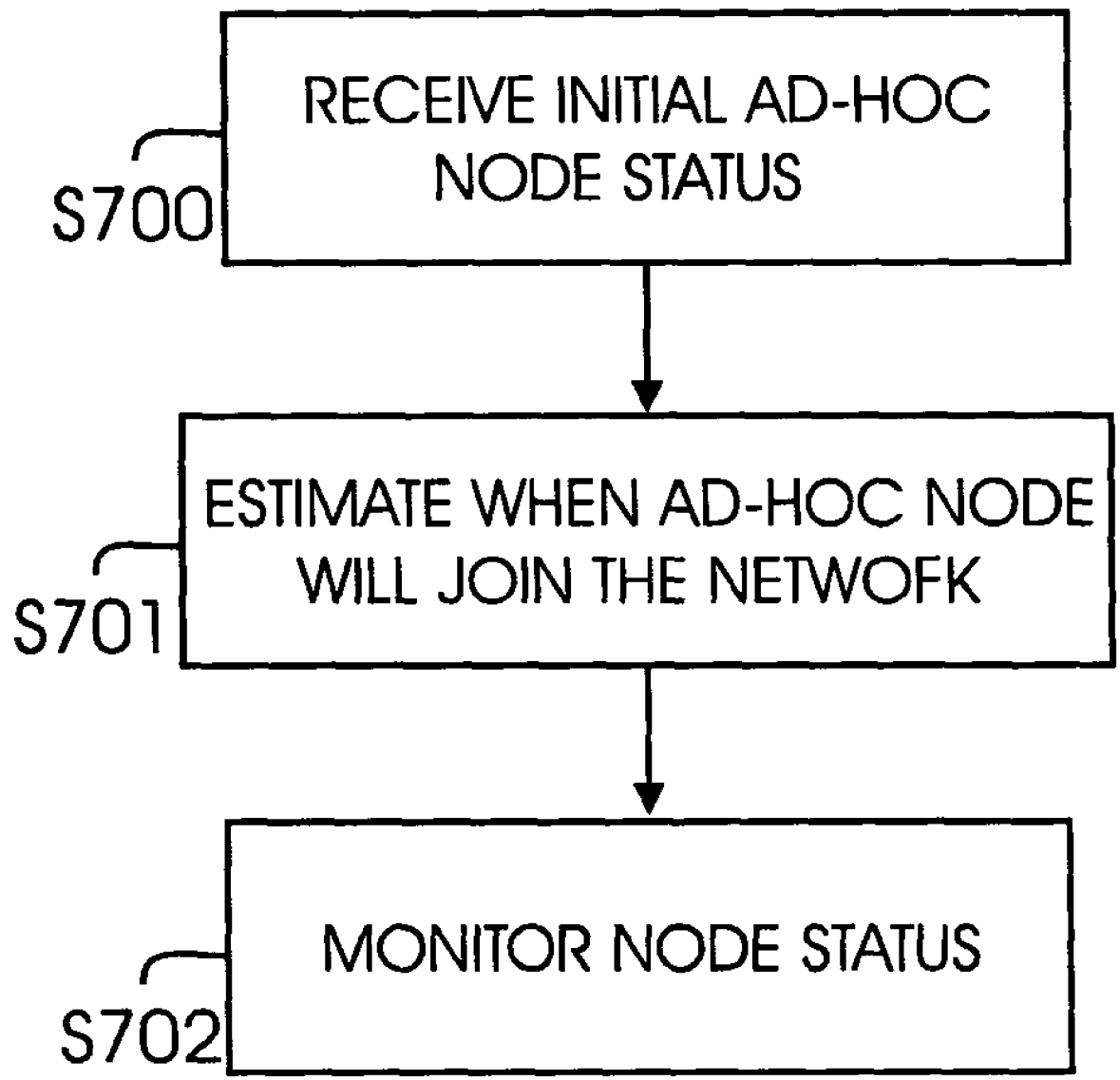
FIG. 7 shows a process flow diagram for monitoring an ad-hoc network node, according to one aspect of the present invention.

FIG. 7 flow diagram shows process steps for monitoring ad-hoc network node(s) 102B in a generic sense. In step S700, data center 105A receives initial node status, for example, ACARSINT 108A described above, or a train/boat's departure. In step S701, the process determines when node 102B will join the ad-hoc network (Internet 101 and/or data center 105A). In step S702, the process monitors node 102B. Status of node 102B may be provided from time to time, similar to the status provided with respect to an aircraft described above with respect to FIGS. 2-6.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A method for monitoring real-time navigational data of a mobile node in an ad-hoc network, the method comprising:
   receiving a navigational message from a messaging system external to the ad-hoc network regarding a real-time navigational status of the mobile node;
   determining, based on the navigational message and a threshold value, when the mobile node should be joining the ad-hoc network;
   sending a status message to an entity interested in monitoring the real-time navigational status of the mobile node;
   determining whether the mobile node has joined the ad-hoc network;
   generating another status message if the mobile node fails to join the ad-hoc network when it should; and
   sending a message to a competent entity to begin an investigation into why the mobile node failed to join the ad-hoc network when it should have, if the mobile node failed to join the ad-hoc network when it should have.

2. The method of claim 1, wherein the mobile node is an aircraft, a train, a boat, a ship or an automobile.

3. The method of claim 1, further comprising receiving a message notifying when the mobile node will no longer be part of the ad-hoc network.

4. The method of claim 1, wherein the messaging system external to the ad-hoc network is the Aircraft Communications Addressing and Reporting System.

5. An apparatus comprising:
   a storage device for storing computer-executable process steps; and
   a processor for executing computer-executable process steps including receiving a navigational message from a messaging system external to the ad-hoc network regarding a real-time navigational status of the mobile node; determining, based on the navigational message and a threshold value, when the mobile node should be joining the ad-hoc network; sending a status message to an entity interested in monitoring the real-time navigational status of the mobile node; determining whether the mobile node has joined the ad-hoc network; and generating another status message if the mobile node fails to join the first ad-hoc network when it should, wherein the processor is further configured to send a message to a competent entity to begin an investigation into why the mobile node failed to join the ad-hoc network when it should have, if the mobile node failed to join the ad-hoc network when it should have.

6. The apparatus of claim 5, wherein the mobile node is an aircraft, a train, a boat, a ship or an automobile.

7. The apparatus of claim 5, wherein the processor is further configured to receive a message notifying when the mobile node will no longer be part of the ad-hoc network.

8. The apparatus of claim 5, wherein the messaging system external to the ad-hoc network is the Aircraft Communications Addressing and Reporting System.

9. A system comprising:
   a data center that receives a navigational message from a messaging system external to the ad-hoc network regarding a real-time navigational status of the mobile node;
   determining, based on the navigational message and a threshold value, when the mobile node should be joining the ad-hoc network;
   sends a status message to an entity interested in monitoring the real-time navigational status of the mobile node;
   determining, whether the mobile node has joined the ad-hoc network; and
generates another status message if the mobile node fails to join the ad-hoc network when it should; and
   sends a message to a competent entity to begin an investigation into why the mobile node failed to join the ad-hoc network when it should have, if the mobile node failed to join the ad-hoc network when it should have.

10. The system of claim 9, wherein the mobile node is an aircraft, a train, a boat, a ship or an automobile.

11. The system of claim 9, wherein the data center receives a message notifying when the mobile node will no longer be part of the ad-hoc network.

12. The system of claim 9, wherein the messaging system external to the ad-hoc network is the Aircraft Communications Addressing and Reporting System.

* * * * *